US009116350B2

(12) United States Patent
Freedman et al.

(10) Patent No.: US 9,116,350 B2
(45) Date of Patent: Aug. 25, 2015

(54) MEMS SCANNING MIRROR FIELD OF VIEW PROVISION METHODS AND APPARATUS

(71) Applicant: INTEL CORPORATION, Santa Clara, CA (US)

(72) Inventors: Barak Freedman, Binyamina (IL); Arnon Hirshberg, Koranit (IL)

(73) Assignee: INTEL CORPORATION, Santa Clara, CA (US)

( * ) Notice: Subject to any disclaimer, the term of this patent is extended or adjusted under 35 U.S.C. 154(b) by 58 days.

(21) Appl. No.: 13/997,986

(22) PCT Filed: Mar. 11, 2013

(86) PCT No.: PCT/US2013/030286
§ 371 (c)(1),
(2) Date: Jun. 25, 2013

(87) PCT Pub. No.: WO2014/142794
PCT Pub. Date: Sep. 18, 2014

(65) Prior Publication Data
US 2014/0253992 A1      Sep. 11, 2014

(51) Int. Cl.
*G02B 26/10*       (2006.01)
*G02B 26/08*       (2006.01)

(52) U.S. Cl.
CPC .......... *G02B 26/105* (2013.01); *G02B 26/0833* (2013.01)

(58) Field of Classification Search
CPC ....... G02B 26/0833; G02B 5/32; G02B 26/10
USPC ................................ 359/198.1, 207.9, 214.1
See application file for complete search history.

(56) References Cited

U.S. PATENT DOCUMENTS

| 2001/0030779 | A1 | 10/2001 | Ho |
| 2004/0212907 | A1 | 10/2004 | Mala et al. |
| 2006/0097053 | A1 | 5/2006 | Jolivet et al. |
| 2011/0013249 | A1 | 1/2011 | Desai |

FOREIGN PATENT DOCUMENTS

| JP | 2006-018250 A | | 1/2006 |
| JP | 2006018250 A | * | 1/2006 |

OTHER PUBLICATIONS

The English transilation of Japanese document (JP 2006-018250 A).*
International Search Report and Written Opinion of the International Searching Authority mailed Dec. 10, 2013 for PCT Application No. PCT/US2013/030286; 13 pages.
Taiwan Office Action for TW Application No. 103106271, dated Dec. 19, 2014, 4 pages.

* cited by examiner

*Primary Examiner* — Scott J Sugarman
*Assistant Examiner* — Ephrem Mebrahtu
(74) *Attorney, Agent, or Firm* — Schwabe Williamson & Wyatt PC (57) ABSTRACT

Embodiments of the present disclosure provide techniques and configurations for an optoelectronic assembly including a MEMS scanning mirror. In one embodiment, the MEMS scanning mirror may include a micro-scale mirror configured to be rotatable about a chord axis of the mirror to deflect an incident light beam into an exit window of the optoelectronic assembly, and a support structure configured to host the mirror to provide a light delivery field between a mirror surface and the exit window such that a path of the deflected light beam via the provided light delivery field to the exit window is un-obstructed. Other embodiments may be described and/or claimed.

14 Claims, 5 Drawing Sheets

MEMS SCANNING MIRROR FIELD OF VIEW PROVISION METHODS AND APPARATUS

CROSS REFERENCE TO RELATED APPLICATION

The present application is a national phase entry under 35 U.S.C. §371 of International Application No. PCT/US2013/030286, filed Mar. 11, 2013, entitled "MEMS SCANNING MIRROR FIELD OF VIEW PROVISION METHODS AND APPARATUS," which designates, among the various States, the United States of America, and the entire contents and disclosures of which are hereby incorporated by reference in their entireties.

FIELD

Embodiments of the present disclosure generally relate to the field of opto-electronics, and more particularly, to MEMS scanning mirror field of view provision.

BACKGROUND

One of the fundamental design considerations in the construction of optoelectronic systems, such as laser scanners, projectors, and other laser devices is an allowed field of view (FOV) of a controlled deflection of laser beams, provided by scanning mirrors included in the system. The FOV may be limited by a mechanical form factor (physical dimensions) of the system. For example, laser projector units embedded in mobile devices may have stringent size limitations in order to fit into the mobile devices. Accordingly, the projector units may be designed taking into account stringent size limitations in the direction of projection, to allow embedding of the designed unit in mobile devices. On the other hand, it may be desirable to have the projector units with a relatively large FOV because of the short use distances of projector units, e.g., in the mobile devices. A combination of a small form factor and large FOV requirements for a laser device may present a challenge for designers. One of the solutions for building laser devices with form factor restrictions may be using Micro-Elecro-Mechanical Systems (MEMS) scanning mirrors, silicon devices etched for specific mechanical shapes. However, laser devices such as projector units with MEMS scanning mirrors may have a very limited FOV due to mechanical constraints described above.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure include techniques and configurations for MEMS scanning mirror field of view provision.

In the following detailed description, reference is made to the accompanying drawings which form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

In various embodiments, the phrase "a first feature formed, deposited, or otherwise disposed on a second feature," may mean that the first feature is formed, deposited, or disposed over the second feature, and at least a part of the first feature may be in direct contact (e.g., direct physical and/or electrical contact) or indirect contact (e.g., having one or more other features between the first feature and the second feature) with at least a part of the second feature.

Figure 1:
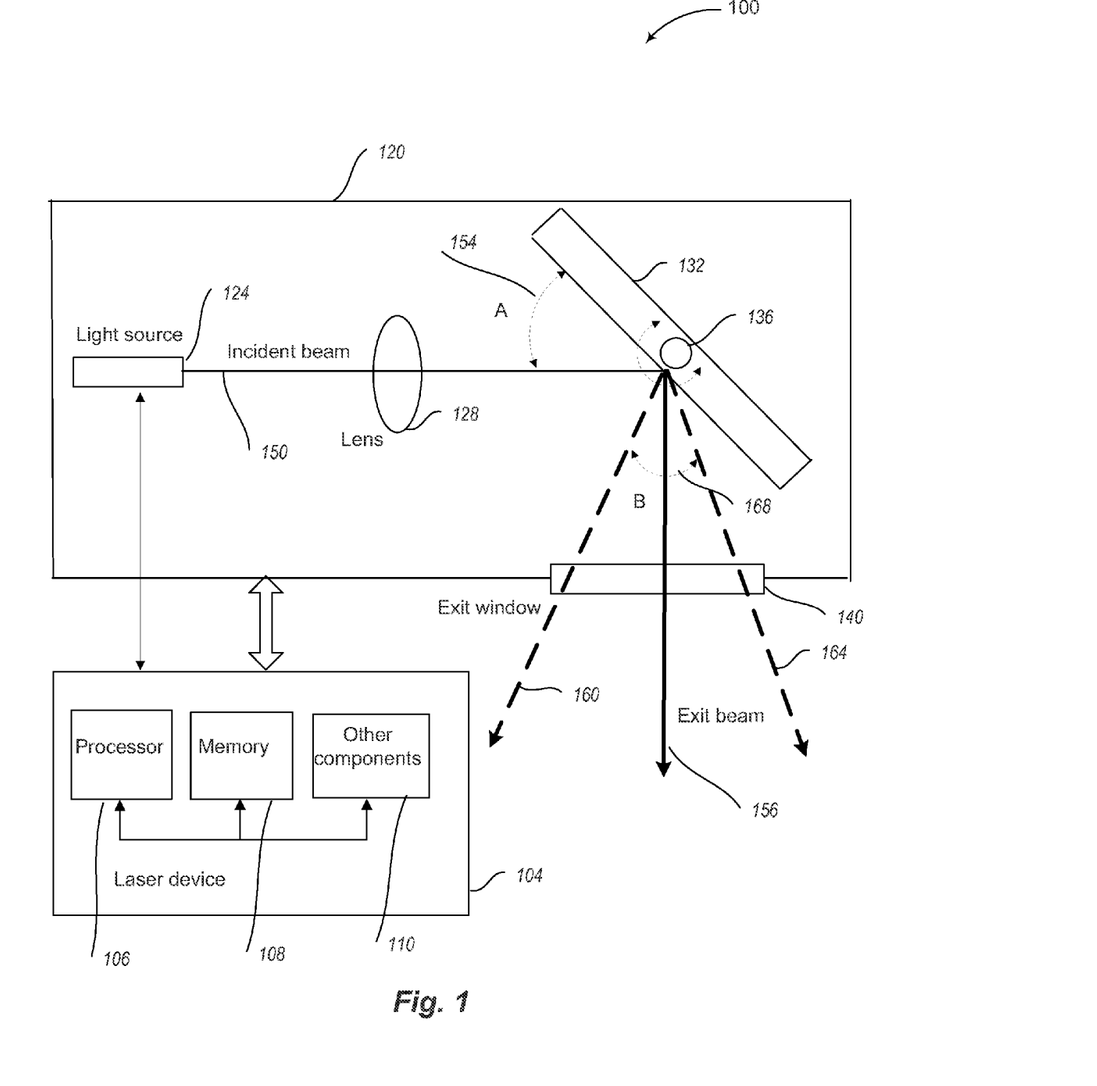
FIG. 1 schematically illustrates an example optoelectronic device including an optoelectronic assembly, in accordance with some embodiments.

FIG. 1 schematically illustrates an example optoelectronic device 100 having a MEMS scanning mirror with a field of view provided in accordance with some embodiments of the present disclosure. In some embodiments, as illustrated, the device 100 may include a laser device 104, such as a laser projector or laser scanner, having a number of components. The components may include a processor 106, coupled with a memory 108, and other components 110 configured to enable various functionalities required from the optoelectronic device 100. For example, the processor 106 may be configured with executable instructions stored in the memory 108 to provide functionalities of a laser projector, laser scanner or other laser device. The device 100 components may include an optoelectronic assembly 120 configured to provide an exit beam with a required field of view, in accordance with various embodiments described below. In some embodiments, the processor 106, the memory 108, other components 110, and optoelectronic assembly 120 may be disposed on the same substrate. In other embodiments, the processor 102, the memory 108, other components 110, and optoelectronic assembly 120 may be disposed on different substrates that are operatively coupled together. In general, the optoelectronic assembly 120 may be embedded in, or otherwise associated with, the device 100.

The optoelectronic assembly 120 may include a light source 124 configured to provide an incident light beam 150, in some embodiments, an incident laser beam. In some embodiments, the light source 124 may be disposed within the assembly 120, while in other embodiments the light source may be disposed outside of the assembly 120. The light source 124 may be configured to direct the incident beam 150 such that the beam 150 passes through an optical lens 124 and is received and deflected by a MEMS scanning mirror 132, according to various embodiments. MEMS scanning mirror 132 may provide an enhanced field of view or otherwise meet a field of view requirement, employing techniques of the present disclosure to be described later with references to FIGS. 2-5 in greater detail.

In some embodiments, mirror of MEMS scanning mirror 132 may be made of silicon (Si), although in different materials providing required properties related to scanning mirror reflection qualities may be utilized in various embodiments. In some embodiments, the incident beam 150 may enter the MEMS scanning mirror 132, when the MEMS scanning mirror 132 is in its resting position as shown, under an angle A 154 relative to a surface of the scanning mirror 132, which may be substantially about 45 degrees, in some embodiments, up to 70 degrees or any impinging angle. Other suitable angles A may be used in other embodiments. The MEMS scanning mirror 132, while in resting position, may deflect the incident beam 150 in a form of an exit beam 156 that may exit the optoelectronic assembly 120 through an exit window 140, as shown.

In some embodiments, the MEMS scanning mirror 132 may be configured to be rotatable, in some embodiments, at least partially rotatable, around a chord axis 136, in order to deflect the incident beam 150 with a scanning angle B 168 that may correspond to a desired or required field of view (FOV) defined by the exit beams 160 and 164. To provide a required FOV, the MEMS scanning mirror 132 may be configured according to techniques and configurations described further herein. In some embodiments, the chord axis 136 may comprise a center axis of the MEMS scanning mirror 132.

In some embodiments, the optoelectronic assembly 120 may be configured to satisfy different engineering requirements to a form factor of the optoelectronic assembly. For example, a width of the optoelectronic assembly 120 (i.e., its dimension parallel the direction of the exit beam 156) may be required to be within a range from about 2 millimeters (mm) to 5 mm.

In some embodiments, the optoelectronic device 100 described herein may include additional components in some embodiments. For example, the processor 106, the memory 108, and/or other components 110 may comport with a processor-based system that may be a part of, or include, the optoelectronic device 100, in accordance with some embodiments. The memory 108 for one embodiment may include any suitable volatile memory, such as suitable Dynamic Random Access Memory (DRAM), for example.

The processor 106, memory 108, other components 110, and optoelectronic assembly 120 may be coupled with one or more interfaces (not shown) configured to facilitate information exchange among the above-mentioned components. Communications interface(s) (not shown) may provide an interface for the device 100 to communicate over one or more wired or wireless network(s) and/or with any other suitable device. In various embodiments, the device 100 including the optoelectronic assembly 120 may be, but is not limited to, a server, a workstation, a desktop computing device, or a mobile computing device (e.g., a laptop computing device, a handheld computing device, a handset, a tablet, a smartphone, a netbook, ultrabook, etc.).

In various embodiments, the device 100 may have more or less components, and/or different architectures. For example, in some embodiments, the device 100 may include one or more of a camera, a keyboard, display such as a liquid crystal display (LCD) screen (including touch screen displays), a touchscreen controller, non-volatile memory port, antenna or multiple antennas, graphics chip, ASIC, speaker(s), a battery, an audio codec, a video codec, a power amplifier, a global positioning system (GPS) device, a compass, an accelerometer, a gyroscope, and the like. In various embodiments, the device 100 may have more or less components, and/or different architectures. In various embodiments, techniques and configurations described herein may be used in a variety of systems that benefit from the principles described herein such as optoelectronic, electro-optical, MEMS devices and systems, and the like.

Figure 2:
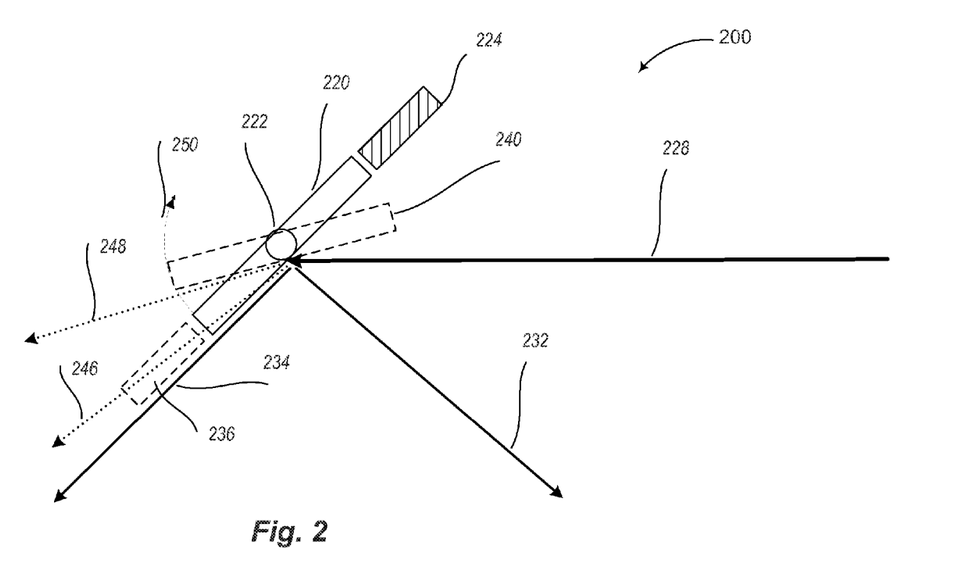
FIG. 2 schematically illustrates an example cross-section top view of a MEMS scanning mirror included in the optoelectronic assembly of FIG. 1, in accordance with some embodiments.
Figure 3:
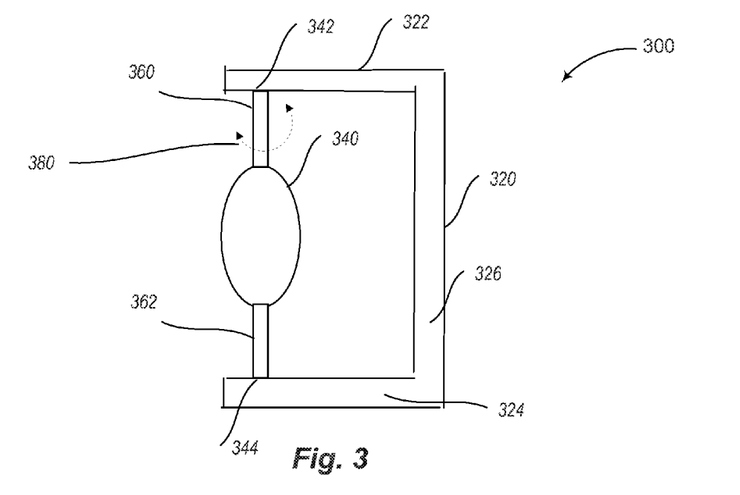
FIG. 3 schematically illustrates a side view of some of the components of the MEMS scanning mirror of FIG. 2, in accordance with some embodiments.

FIG. 2 schematically illustrates an example cross-section top view of some parts of the optoelectronic assembly 120, namely a MEMS scanning mirror assembly 200 that may be used as scanning mirror 132, in accordance with some embodiments. FIG. 3 schematically illustrates a side view 300 of some of the components of the MEMS scanning mirror assembly 200 of FIG. 2, in accordance with some embodiments. Referring to FIGS. 2 and 3, the MEMS scanning mirror assembly 200 (300) may comport with embodiments described in connection with the optoelectronic assembly 120 of FIG. 1 and vice versa.

Referring to FIG. 2, the assembly 200 may include a micro scale scanning mirror 220 and an asymmetric micro scale support structure 224 configured to house the scanning mirror 220 so as to provide an unobstructed field of view for an incident beam 228 deflected by the scanning mirror 220, when rotated as described below, and defined by the exit beams 234 (or, in different rotation angles, 246 and 248), and 232. As shown, in some embodiments, the support structure 224 may enable an unobstructed pathway of the exit beams 232, 234, thereby providing an enhanced field of view for MEMS scanning mirror assembly 200. In one embodiment, the asymmetric micro scale support structure 224 may be substantially linear and have a "]" or "[" like shape as illustrated in FIG. 3. The asymmetric micro scale support structure 224 may be further configured to provide an ability for the mirror 220 to be rotatable about its chord axis 222, at least in the direction indicated by the numeral 250.

For example, a full rotation (360 degrees) of the scanning mirror may define a substantially spherical three-dimensional (3D) space. The 3D space may be defined by four quadrants, with a plane of the mirror 220 in its resting position dividing the 3D space into two two-quadrant halves and a plane perpendicular to the plane of the scanning mirror defining the 3D space into other two two-quadrant halves. A center of the spherical 3D space may substantially conform to a geometrical center of the mirror 220. In rotation, e.g., as indicated by the numeral 250, a portion of the mirror 220 may traverse a first quadrant of the 3D space, while the other portion of the scanning mirror may traverse a second quadrant of the 3D space diagonally opposing the first quadrant of the 3D space. In some embodiments, the asymmetric micro scale support structure 224 may be proximally disposed on less than an entirety, e.g., one half, of a great circle of the spherical 3D space defined as described above, in order to be able to oscillate back and forth.

As shown, the mirror 220 may be rotatable at least from its resting position indicated by the numeral 220 to a position indicated by the numeral 240, in order to provide a scan angle that ensures a required field of view for the exit beams 232, 234, 246, and 248. In some embodiments, the mirror 220 may be configured to be rotatable in the direction opposite the one indicated by the numeral 250. The exit beams 246 and 248 indicate different directions of exit beams while scanning mirror is rotation from its resting position to its first position indicated by the numeral 240 in the direction indicated by 250. As shown, the pathway for the beams 234, 246, 248 may be unobstructed during the scanning mirror 220 rotation. In contrast, in case of a conventional, symmetric support structure, the pathway for the deflected beams 234, 246, and 248 may be obstructed by a portion of the structure 236 (indicated by a dashed line), which may be absent in the embodiments described herein.

FIG. 3 schematically illustrates a side view 300 of the MEMS scanning mirror assembly 200 of FIG. 2, in accordance with some embodiments. The MEMS scanning mirror assembly 300 may include a substantially asymmetric linear support structure 320 configured to receive a micro scale mirror 340. In some embodiments, the asymmetric linear support structure 320 may be configured as substantially frame-shaped structure, for example, in a shape of "]" or "[," as described earlier. For example, the asymmetric linear support structure 320 may include a first arm 322, a second arm 324, and a longitudinal segment 326 coupling (e.g., joining) the first and second arms 322 and 324. The arms 322 and 324, coupled with the longitudinal segment 326, may define a space (e.g., cavity) to receive the mirror 340.

The mirror 340 may be rotatable around its chord axis as shown by the numeral 380. The chord axis may in some embodiments conform to a center axis of the scanning mirror 340 and may include two longitudinal segments 360 and 362, respectively extending from the first and second arms 322 and 324 (e.g., at points 342 and 344 located substantially toward the ends of the first and second arms 322 and 324) to engage the mirror 340 substantially at a first end point and a second end point of the chord axis of the mirror 340. In some embodiments, the asymmetric linear support structure 320 may have a number of different shapes (not show), such as semi-oval, semi-circle, and the like. In all described embodiments, the asymmetric linear support structure 320 may be configured to provide an unobstructed field of view for an incident beam deflected by the scanning mirror 340 while rotating as shown by the numeral 380 and described in reference to FIG. 2.

Figure 4:
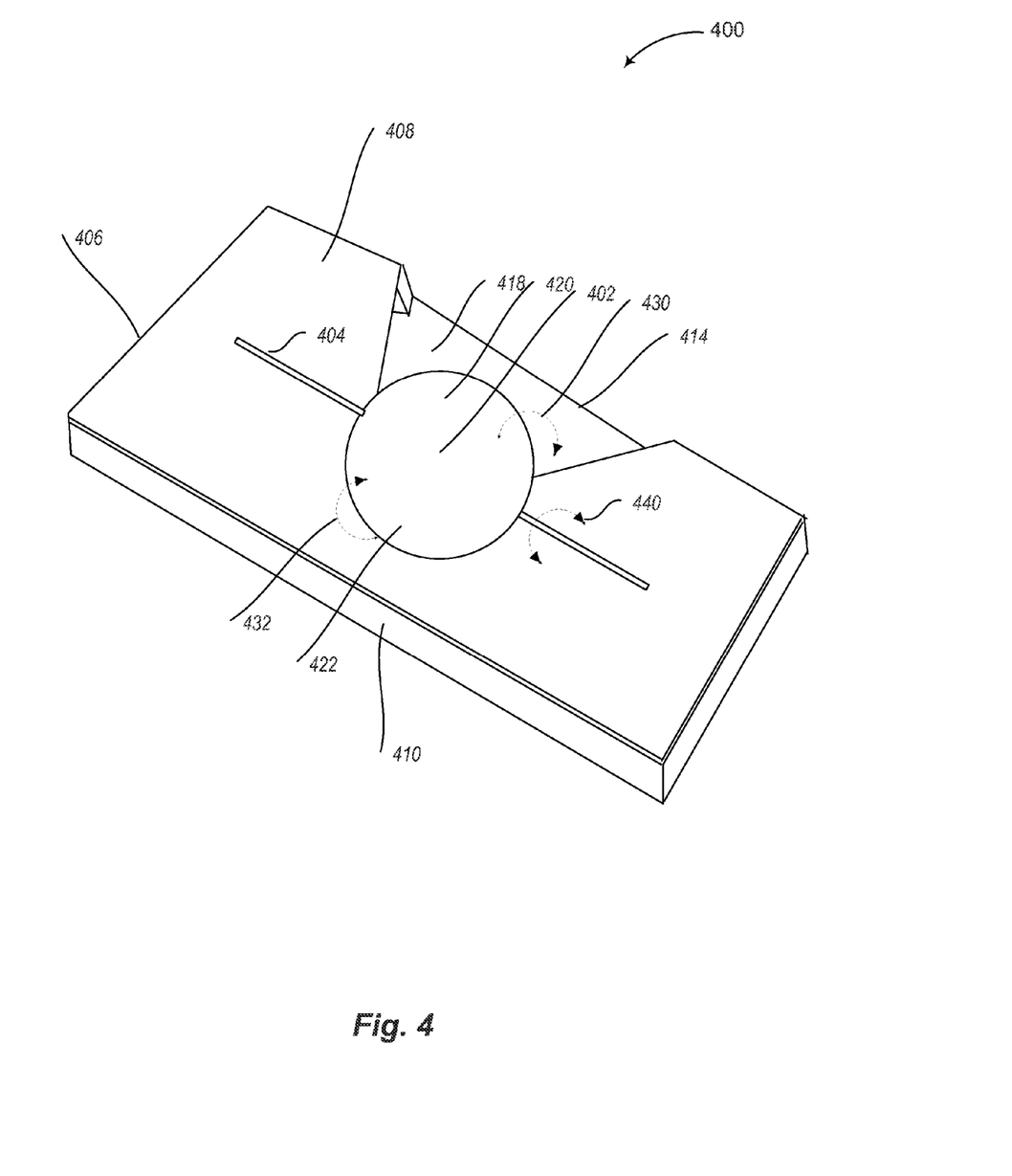
FIGS. 4 and 5 schematically illustrate perspective views of two example MEMS scanning mirrors, in accordance with some embodiments.
Figure 5:
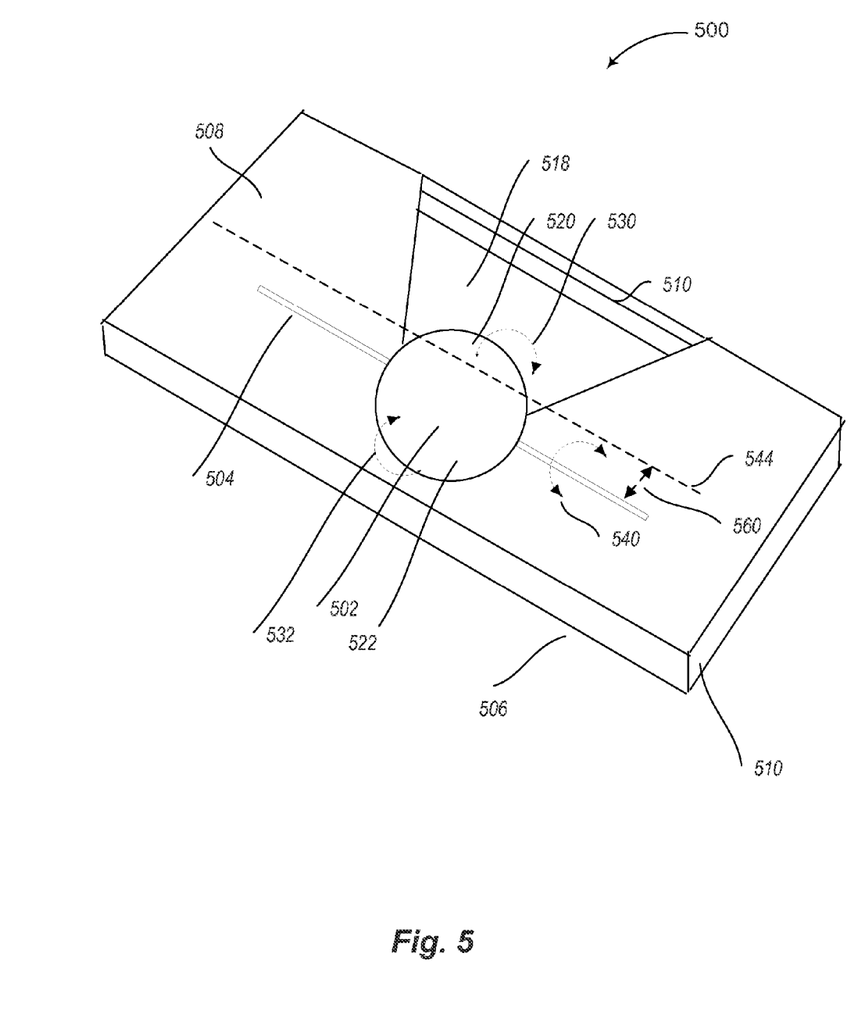

A part of the optoelectronic assembly 120 comprising the scanning mirror assembly 300 may be implemented in a number of different ways, in order to provide sufficient support for the rotatable mirror described above in reference to FIGS. 2 and 3, while ensuring a required FOV for the light (e.g., laser) beam deflected by the scanning mirror. FIGS. 4 and 5 schematically illustrate perspective views of two example MEMS scanning mirror assemblies 400 and 500, in accordance with some embodiments. According to various embodiments, components of the assemblies 400 and 500 may comport with embodiments described in connection with the components of the scanning mirror assembly 200 (300) of FIGS. 2-3 and vice versa. The assemblies 400 and 500 of FIGS. 4 and 5 may further include components that are not depicted in FIGS. 2 and 3.

The scanning mirror assembly 400 of FIG. 4 may include a mirror 402 having a substantially oval or circular shape, configured to be rotatable about a chord axis 404, and an asymmetric micro scale support structure 406 configured to house the scanning mirror 402. In some embodiments, the chord axis 404 may be a center axis of the mirror 402. In some embodiments, the mirror 402 may be configured to be have more than one degrees of freedom, for example, the mirror may be configured to be rotatable, and scan incoming beams in two perpendicular planes, e.g., vertical plane (using the chord axis 404) and horizontal plane (not shown). The asymmetric micro scale support structure 406 may include a multilayer substrate having at least two layers, as shown in FIG. 4. The layers may include a Silicon-On-Insulator (SOI) wafer of any known kind, e.g., double, triple, and the like. For example, the asymmetric multi-layer substrate support structure 406 may include an upper layer (substrate) 408 and a lower layer (substrate) 414 bonded together directly or via one or more intermediate layers, for example, by a frame 410. The lower layer 414 may be used as a backing for the multilayer substrate support structure 406. The mirror 402 with the chord axis 404 may be disposed/embedded into the multilayer substrate 406, substantially flushed with the upper layer 408 as shown. The multi-layer substrate support structure 406 may be configured to host the mirror 402 in a manner that allows the mirror 402 to be rotatable about the chord axis 404 to deflect an incident beam that may be provided, e.g., by a light source 124.

To provide this functionality, the multi-layer substrate support structure 406 may have a cutout 418 at the upper layer 418 that may be dimensioned to enable the mirror 402 to provide an enhanced/enlarged FOV for the deflected beam and a required freedom of rotation as indicated by the numeral 440. In some embodiments, the multi-layer substrate structure may have the cutout 418 on at least one side of the structure 406, as illustrated in FIG. 4. In some embodiments, the cutout may extend to both sides of the structure 406, e.g., when an incoming beam may be directed at an angle of 70 degrees or higher. The cutout 418 may be defined at least in part by an opening in the upper layer 408 and the intermediate layers, if any. In some embodiments, the cutout 418 may have a substantially trapezoid-like shape, as illustrated in FIG. 4. However, in some embodiments, the cutout 418 may have other shapes configured to provide an unobstructed pathway for a light (e.g., laser) beam deflected by the scanning mirror 402 during rotation. For example, the cutout 418 may have a substantially rectangular shape.

In a resting position, as described earlier, the mirror 402 may be disposed substantially flush with a surface plane of an upper layer 408 of the multi-layer substrate structure 406. When the mirror 402 rotates from its resting position clockwise, an upper (right) portion 420 of the mirror 402 may move below the plane of the upper layer 408, as indicated by the numeral 430, while another, lower (left) portion 422 of the mirror 402 may move above the plane of the upper layer 408, as indicated by the numeral 432. An incident beam (not shown), directed at the mirror under substantially 45 degrees as described in reference to FIGS. 1 and 2, may be deflected by the mirror 402 and may exit the optoelectronic assembly 120 via an unobstructed pathway provided by a light delivery field defined by the cutout 418.

FIG. 5 schematically illustrates another example MEMS scanning mirror assembly 500, in accordance with some embodiments. Somewhat similar to the embodiment described in reference to FIG. 4, the scanning mirror assembly 500 may include a micro scale mirror 502 having a substantially oval or circular shape that is configured to be rotatable about a chord axis 504, and a support structure 506. In some embodiments, the chord axis 504 may be a center axis of the mirror 502. The support structure 506 may include a support structure as shown in FIG. 5. In some embodiments, the support structure may be a multi-layer substrate structure. In some embodiments, the support structure 506 may include at least an upper layer (substrate) 508 that may be substantially defined by a frame 510. In some embodiments, a lower layer (substrate) (not shown) may be used as a backing for the support structure 506. The mirror 502 with the chord axis 504 may be disposed on the upper layer 508 as shown. The support structure 506 may be configured to host the mirror 502 in a manner that allows the mirror 502 to be rotatable about the chord axis 504 of the mirror to deflect an incident beam that may be provided, e.g., by a light source 124.

To provide this functionality, the support structure 506 may have a cutout 518 that may be dimensioned to provide the mirror 502 with a required FOV for the deflected beam and a required freedom of rotation as indicated by the numeral 540. In some embodiments, the structure may have the cutout 518 at one side of the structure 506, as illustrated in FIG. 5. The cutout 518 may be defined at least in part by an opening in the upper layer 508, and intermediate layers, if any. In some embodiments, the cutout 518 may have a substantially trapezoid-like shape, as illustrated in FIG. 5. However, in some embodiments, the cutout 518 may have other shapes configured to provide an unobstructed pathway for a light (e.g., laser) beam deflected by the scanning mirror 502 during rotation. For example, the cutout 518 may have a substantially rectangular shape. In order to further provide the above-noted functionality, the scanning mirror 502 may be disposed in the upper layer 508 such that the chord axis 504 may be offset from a center axis 544 of the support structure 506, for example, by a length indicated by the numeral 560. The configuration of the scanning mirror 502 offset from the center axis 544, allows for the cutout 518 to be sufficient to provide for an unobstructed field of view for an incoming light beam deflected by the mirror 502 during rotation around the center axis 544, while maintaining sufficiently strong support structure 506 for the mirror 502.

In a resting position, the scanning mirror 502 may be disposed substantially flush with a surface plane of an upper layer 508 of the support structure 506. When the scanning mirror 502 rotates from its resting position clockwise, an upper (right) portion 520 of the scanning mirror 502 may move below the plane of the upper layer 508, as indicated by the numeral 530, while another, lower (left) portion 522 of the scanning mirror 502 may move above the plane of the upper layer 508, as indicated by the numeral 532. An incident beam (not shown), directed at the scanning mirror 502 under substantially 45 degrees relative to the scanning mirror 502 surface as described in reference to FIGS. 1 and 2, may be deflected by the scanning mirror 502 and may exit the optoelectronic assembly 120 via an unobstructed pathway provided by a light delivery field defined by the cutout 518.

Figure 6:
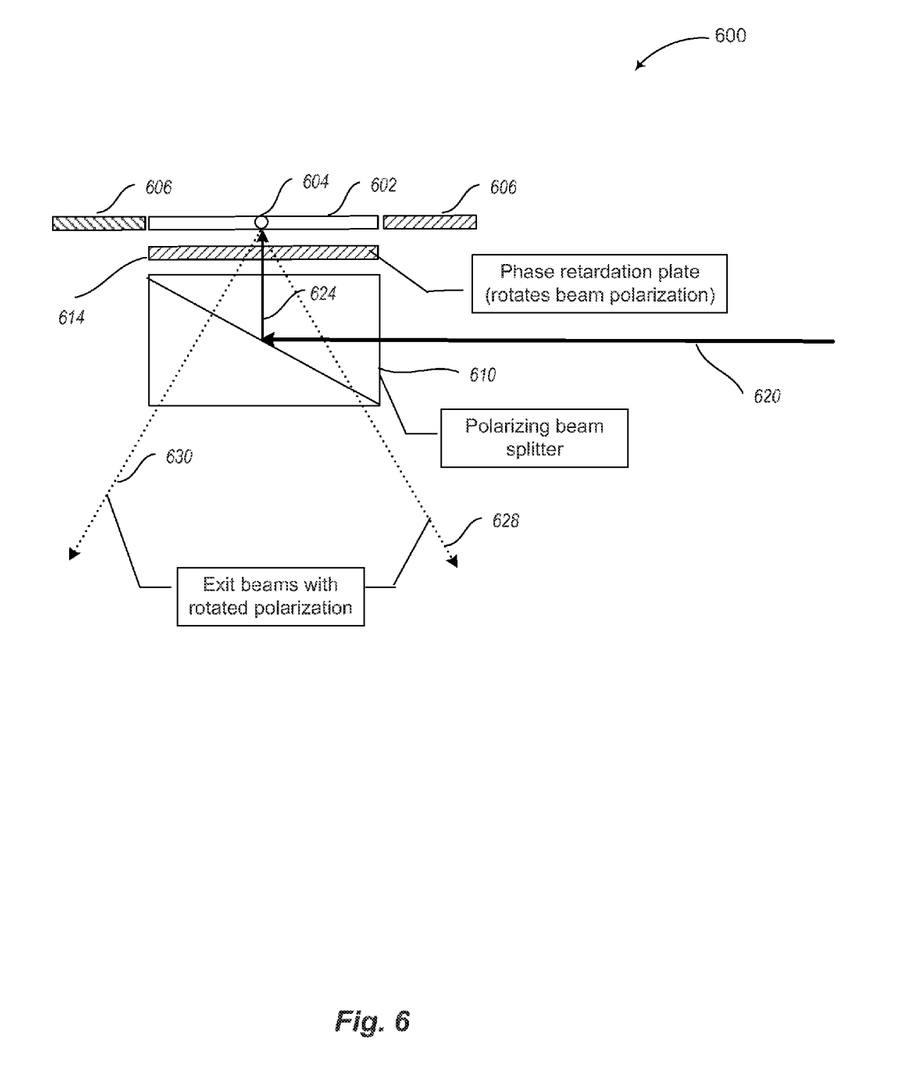
FIG. 6 schematically illustrates a diagram of an example optoelectronic assembly, in accordance with some embodiments.

FIG. 6 schematically illustrates a diagram of an example optoelectronic assembly 600, in accordance with some embodiments. The example optoelectronic assembly 600 employs various features to be described more fully below, enabling a conventional, symmetric MEMS scanning mirror assembly as briefly described in reference to FIG. 2, to address the required field of view issue. However, the example optoelectronic assembly 600 may use the asymmetric MEMS scanning mirror assembly described in reference to FIGS. 2-5. FIG. 6 illustrates a cross-sectional view of a mirror 602 supported by a support structure 606. In some embodiments, the support structure may be a conventional symmetric structure, i.e., configured to receive the mirror 602 in a cavity defined by a full frame 606. The example assembly 600 may further include a polarizing beam splitter 610 configured to split an incident beam 620 and polarize at least a portion of the incident beam 620 into a reflected beam 620 to be received and deflected by the scanning mirror 602.

Note that in contrast to the embodiments described in reference to FIGS. 1-5, in an embodiment of the assembly 600 having a symmetric scanning mirror assembly 602-606, the incident beam 620 may be substantially parallel relative to a plane of the scanning mirror 602, while the beam 624 may be reflected, at least partially, by the beam splitter 610 such that it may be directed at the scanning mirror 602 at a substantially direct angle relative to the plane of the scanning mirror 602. Similar to the embodiments described in reference to FIGS. 1-5, the scanning mirror 602 is configured to be rotatable about its chord axis (in some embodiments, center axis) 604.

The assembly 600 may include a phase retardation plate 614 configured to rotate polarization of the reflected beam 624 and further rotate polarization of the exit beam 628 (630) deflected by the scanning mirror 602, so as to enable the polarizing beam splitter 610 to transmit the beam 628 (630) deflected by the scanning mirror 602 after the beam passes through the retardation plate 614. For example, the phase retardation plate 614 may be configured to rotate polarization of the reflected beam 624 for about 45 degrees, and further rotate polarization of the exit beam 628 (630) for about 45 degrees. Accordingly, the resulting polarization of the exit beam 628 (630) relative to the reflected beam 624 (before polarization rotation by the phase retardation plate) may be about 90 degrees, which polarization may allow the exit beam 628 (630) with rotated polarization to pass through the polarization beam splitter 610 as shown, and exit, e.g., through an exit window (not shown) of the optoelectronic assembly 600.

Accordingly, the assembly 600 may provide for a shallow mechanical setup, wherein the light source (e.g., laser source 124) providing the incident light 620, the polarizing beam splitter 610, and the retardation plate 614 may be disposed at a short distance from the scanning mirror 604, providing a required form factor (e.g., low width of the optoelectronic assembly 600). The described configuration further provides for a steep beam incidence angle (e.g., substantially direct angle relative the scanning mirror plane), which may ensure unobstructed light delivery field for the deflected beam 628 (630) passing through the polarized beam splitter 610.

In some embodiments, an asymmetric scanning mirror assembly similar to those described above in reference to FIGS. 2-5 may be used with the assembly 600. For example, an asymmetric scanning mirror assembly 602-606 may be disposed in the assembly 600 at an angle between 0 and 45 degrees relative to the incident beam 620. The polarizing beam splitter 610 may be configured to direct the reflected beam 624 into the scanning mirror 602 under a small incidence angle, e.g., an angle in the range of 0 to 45 degrees relative to the surface of the scanning mirror 602, when the mirror 602 is in its resting position. To achieve this purpose, the polarizing beam splitter 610 may be configured to be substantially non-square. Using a partial cutout in one of the sides of the support structure 606, similar to one described in reference to FIGS. 4-5, may increase a scanning angle for the exit beam 628 (630), thus achieving a required field of view for the exit beam 628 (630).

Example 1 is an apparatus for providing a micro-electro-mechanical system (MEMS) scanning mirror unobstructed field of view, comprising an optoelectronic assembly associated with a laser device, wherein the assembly includes a MEMS scanning mirror having a field of view, and wherein the MEMS scanning mirror includes: a micro scale scanning mirror having a substantially oval or circular shape; and an asymmetric micro-scale linear frame support structure configured to host the mirror such to enable the mirror to be rotatable about a chord axis of the mirror, with a portion of the mirror traversing a first quadrant of a substantially spherical three-dimensional (3D) space, while the other portion of the mirror traversing a second quadrant of the 3D space diagonally opposing the first quadrant, a center of the spherical 3D space substantially conforming to a geometrical center of the micro scale scanning mirror. The asymmetric micro-scale linear frame support structure is proximally disposed on less than an entire great circle of the spherical 3D space to reduce obstruction of the mirror and enlarge the field of view provided.

Example 2 may include the subject matter of Example 1, and further includes that the asymmetric micro-scale linear frame support structure is proximally disposed on about one half of the great circle.

Example 3 may include the subject matter of Example 1, and further specifies that the asymmetric micro-scale linear frame support structure includes a ]- or [-shaped frame having a first arm, a second arm, and a first longitudinal segment joining the first and second arms, defining a cavity to receive the mirror, and a second longitudinal segment and a third longitudinal segment respectively extending from the first and second arms to engage the mirror substantially at a first end point and a second end point of the chord axis.

Example 4 may include the subject matter of Example 1, and further specifies that the optoelectronic assembly is embedded in the laser device and configured to deflect an incident laser beam produced by the laser device, within the field of view.

Example 5 may include the subject matter of Example 4, and further specifies that the field of view is defined at least in part by dimensions of the cavity defined by the asymmetric micro-scale linear frame support structure of the optoelectronic assembly.

Example 6 may include the subject matter of Example 4, and further specifies that the mirror is configured to receive the incident laser beam with the mirror rotated to a position at least about 70 degrees from a rest position.

Example 7 may include the subject matter of Example 4, and further specifies that the apparatus is a selected one of a laser scanner or a laser projector.

Example 8 may include the subject matter of Example 1, and further specifies that the mirror comprises silicon (Si).

Example 9 may include the subject matter of any of Examples 1 to 8, and further specifies that the chord axis is a center axis of the mirror.

Example 10 is an apparatus for providing a micro-electro-mechanical system (MEMS) scanning mirror unobstructed field of view, comprising: an optoelectronic assembly associated with a laser device, wherein the assembly includes a MEMS scanning mirror having a field of view, and wherein the MEMS scanning mirror includes: a substrate having at least a top layer; and a micro scale mirror having a substantially oval or circular shape, embedded in the top layer of the substrate, wherein the mirror is rotatable about a chord axis of the mirror to deflect a beam from the laser device, and wherein the top layer includes a cutout at one side, dimensioned to reduce obstruction of the mirror to enlarge the field of view.

Example 11 may include the subject matter of Example 10, and further specifies that the cutout is selected from one of a trapezoid-like shape or rectangular-like shape.

Example 12 may include the subject matter of Example 10, and further specifies that the mirror is disposed substantially flushed with the top layer of the multi-layer substrate.

Example 13 may include the subject matter of Example 10, and further specifies that the substrate includes a bottom layer configured to provide support for the MEMS scanning mirror, and wherein a frame defining the substrate includes an opening corresponding to the cutout disposed at the one side of the top layer.

Example 14 may include the subject matter of Example 10, and further specifies that the chord axis of rotation of the mirror is offset from a center axis of the substrate.

Example 15 may include the subject matter of Example 10, and further specifies that the chord axis is a center axis of the mirror.

Example 16 may include the subject matter of Example 10, and further specifies that the optoelectronic assembly is embedded in the laser device and configured to deflect an incident laser beam produced by the laser device, within the field of view.

Example 17 may include the subject matter of Example 16, and further specifies that the mirror is configured to receive the incident laser beam with the mirror rotated to a position at an angle of about 45 degrees from a rest position.

Example 18 may include the subject matter of any of Examples 10 to 17, and further specifies that the mirror comprises silicon (Si).

Example 19 is an apparatus for providing a micro-electro-mechanical system (MEMS) scanning mirror unobstructed field of view, comprising an optoelectronic assembly, including a polarizing beam splitter configured to split an incident beam and polarize at least a portion of the incident beam into a reflected beam; a phase retardation plate configured to rotate polarization of the reflected beam; and a MEMS scanning mirror having a field of view, and configured to receive the reflected beam with rotated polarization under a substantially direct angle and deflect the received beam within the field of view, wherein the phase retardation plate is configured to rotate polarization of the beam deflected by the MEMS scanning mirror such that the polarizing beam splitter is enabled to transmit the beam deflected by the MEMS scanning mirror after the beam passes through the retardation plate.

Example 20 may include the subject matter of Example 19, and further specifies that the apparatus further comprises a laser device, wherein the optoelectronic assembly is embedded in the laser device and configured to transform an incident laser beam produced by the laser device into an exit beam within the field of view.

Example 21 may include the subject matter of Example 20, and further specifies that the polarizing beam splitter is configured to direct the reflected beam at the MEMS scanning mirror at a substantially direct angle relative to a plane of the scanning mirror.

Example 22 may include the subject matter of Example 21, and further specifies that Example 23 may include the subject matter of any of Examples 19 to 23, and further specifies that the MEMS scanning mirror is configured to be at least partially rotatable relative to a resting plane of the MEMS scanning mirror.

Example 24 is an apparatus for providing a micro-electromechanical system (MEMS) scanning mirror unobstructed field of view, comprising an optoelectronic assembly associated with a laser device, including a MEMS scanning mirror; and an exit window for a light beam deflected by the MEMS scanning mirror, wherein the MEMS scanning mirror includes: a micro-scale mirror configured to be rotatable about a chord axis of the mirror to deflect an incident light beam into the exit window; and a support structure configured to host the mirror to provide a light delivery field between a mirror surface and the exit window such that a path of the deflected light beam via the provided light delivery field to the exit window is un-obstructed.

Example 25 may include the subject matter of Example 24, and further specifies that the laser device is selected from one of a laser scanner or a laser projector.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus for providing a micro-electromechanical system (MEMS) scanning mirror unobstructed field of view, comprising:
   an optoelectronic assembly associated with a laser device, wherein the assembly includes a MEMS scanning mirror having a field of view, and wherein the MEMS scanning mirror includes:
      a substrate having at least a top layer; and
      a micro scale mirror having a substantially oval or circular shape, embedded in the top layer of the substrate, wherein the mirror is rotatable about a chord axis of the mirror to deflect a beam from the laser device, and wherein the top layer includes a cutout at one side, dimensioned to reduce obstruction of the mirror to enlarge the field of view, wherein the cutout comprises at least two cutout edges, wherein each cutout edge extends to an edge of the top layer to form a determined angle with the edge of the top layer.

2. The apparatus of claim 1, wherein the cutout is selected from one of a trapezoid-like shape or rectangular-like shape.

3. The apparatus of claim 1, wherein the mirror is disposed substantially flushed with the top layer of the multi-layer substrate.

4. The apparatus of claim 1, wherein the substrate includes a bottom layer to provide support for the MEMS scanning mirror, and wherein a frame defining the substrate includes an opening corresponding to the cutout disposed at the one side of the top layer.

5. The apparatus of claim 1, wherein the chord axis of rotation of the mirror is offset from a center axis of the substrate.

6. The apparatus of claim 1, wherein the chord axis is a center axis of the mirror.

7. The apparatus of claim 1, wherein the optoelectronic assembly is embedded in the laser device and configured to deflect an incident laser beam produced by the laser device, within the field of view.

8. The apparatus of claim 7, wherein the mirror is to receive the incident laser beam with the mirror rotated to a position at an angle of about 45 degrees from a rest position.

9. The apparatus of claim 1, wherein the mirror comprises silicon (Si).

10. An apparatus for providing a micro-electromechanical system (MEMS) scanning mirror unobstructed field of view, comprising:
    an optoelectronic assembly, including:
       a MEMS scanning mirror having a field of view;
       a polarizing beam splitter to:
          receive an incident beam that is provided substantially parallel to a plane of the MEMS scanning mirror in a non-rotated position;
          split the incident beam; and
          polarize at least a portion of the incident beam into a reflected beam, to direct the reflected beam at the MEMS scanning mirror; and
       a phase retardation plate placed between the MEMS scanning mirror and the polarizing beam splitter, to rotate polarization of the reflected beam before the reflected beam enters the MEMS scanning minor:
    wherein the MEMS scanning mirror is to receive the reflected beam with rotated polarization under a substantially direct angle and deflect the received beam within the field of view,
    wherein the phase retardation plate is to further rotate polarization of the beam deflected by the MEMS scanning mirror,
    wherein the polarizing beam splitter is further to transmit the beam deflected by the MEMS scanning mirror after the beam passes through the retardation plate and the polarization of the deflected beam has been further rotated by the retardation plate.

11. The apparatus of claim 10, wherein the apparatus further comprises a laser device, wherein the optoelectronic assembly is embedded in the laser device and configured to transform an incident laser beam produced by the laser device into an exit beam within the field of view.

12. The apparatus of claim 11, wherein the polarizing beam splitter is to direct the reflected beam at the MEMS scanning mirror at a substantially direct angle relative to a plane of the scanning mirror.

13. The apparatus of claim 12, wherein the MEMS scanning mirror is to be at least partially rotatable relative to a resting plane of the MEMS scanning mirror.

14. The apparatus of claim 10, wherein the phase retardation plate is to rotate the polarization of the beam reflected by the polarizing beam splitter by about 45 degrees and to further rotate the polarization of the beam deflected by the scanning mirror by about 45 degrees.

* * * * *